Dec. 11, 1923.
L. R. BOGARDUS
1,477,474
DYNAMOMETER CONTROL APPARATUS
Filed Jan. 16, 1919     3 Sheets-Sheet 1
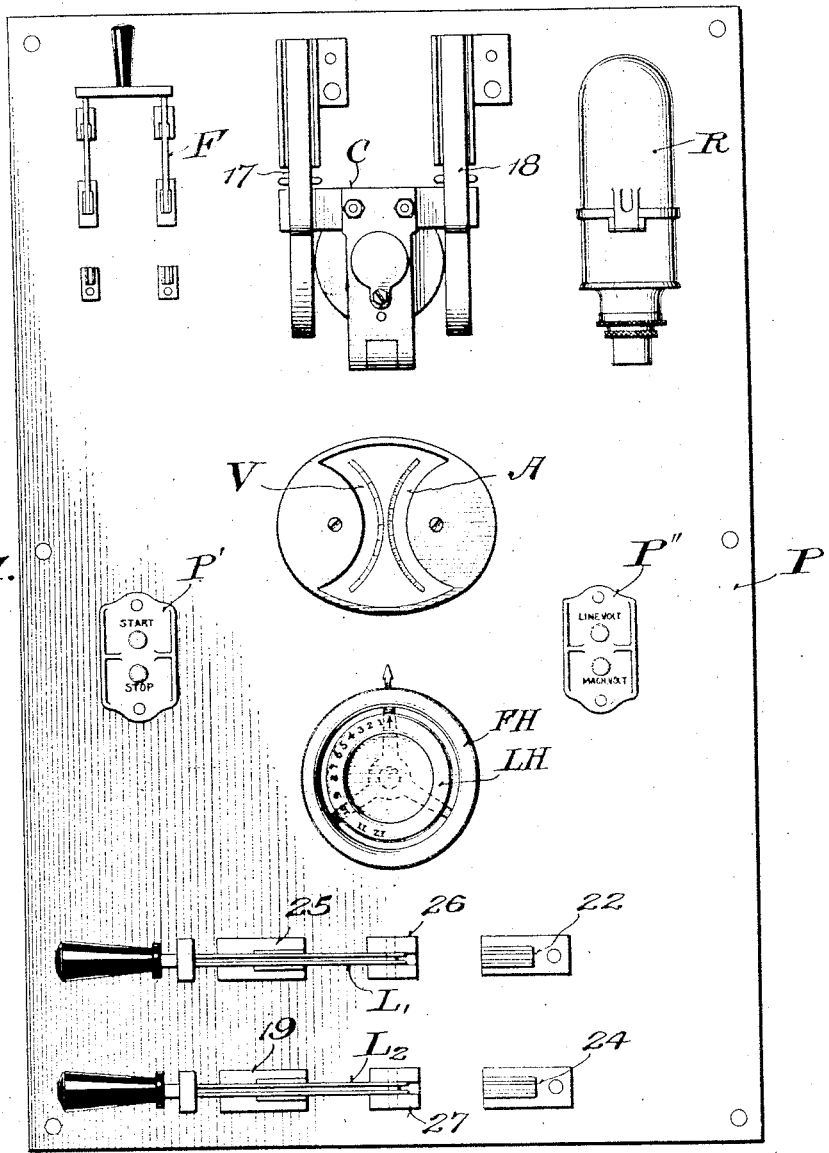
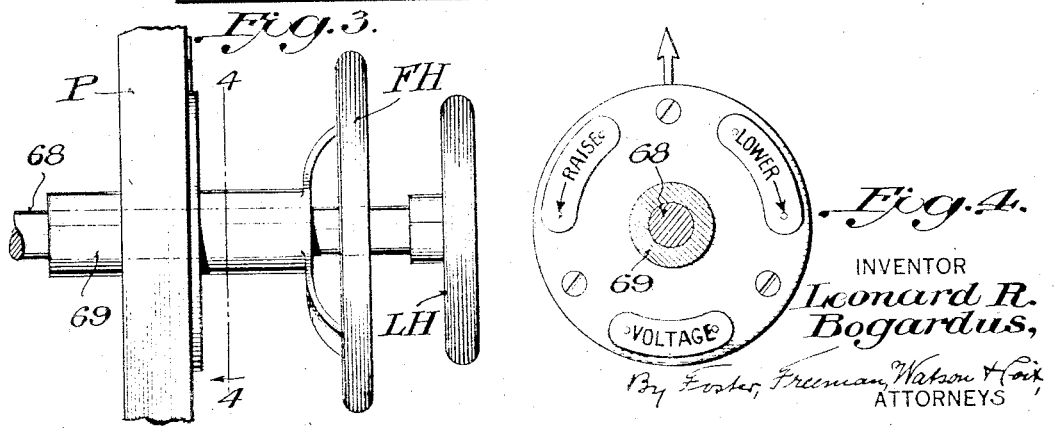
INVENTOR
Leonard R. Bogardus,
By Foster, Freeman, Watson & Coit
ATTORNEYS Dec. 11 1923
L. R. BOGARDUS
DYNAMOMETER CONTROL APPARATUS
Filed Jan. 16, 1919
1,477,474
3 Sheets-Sheet 2
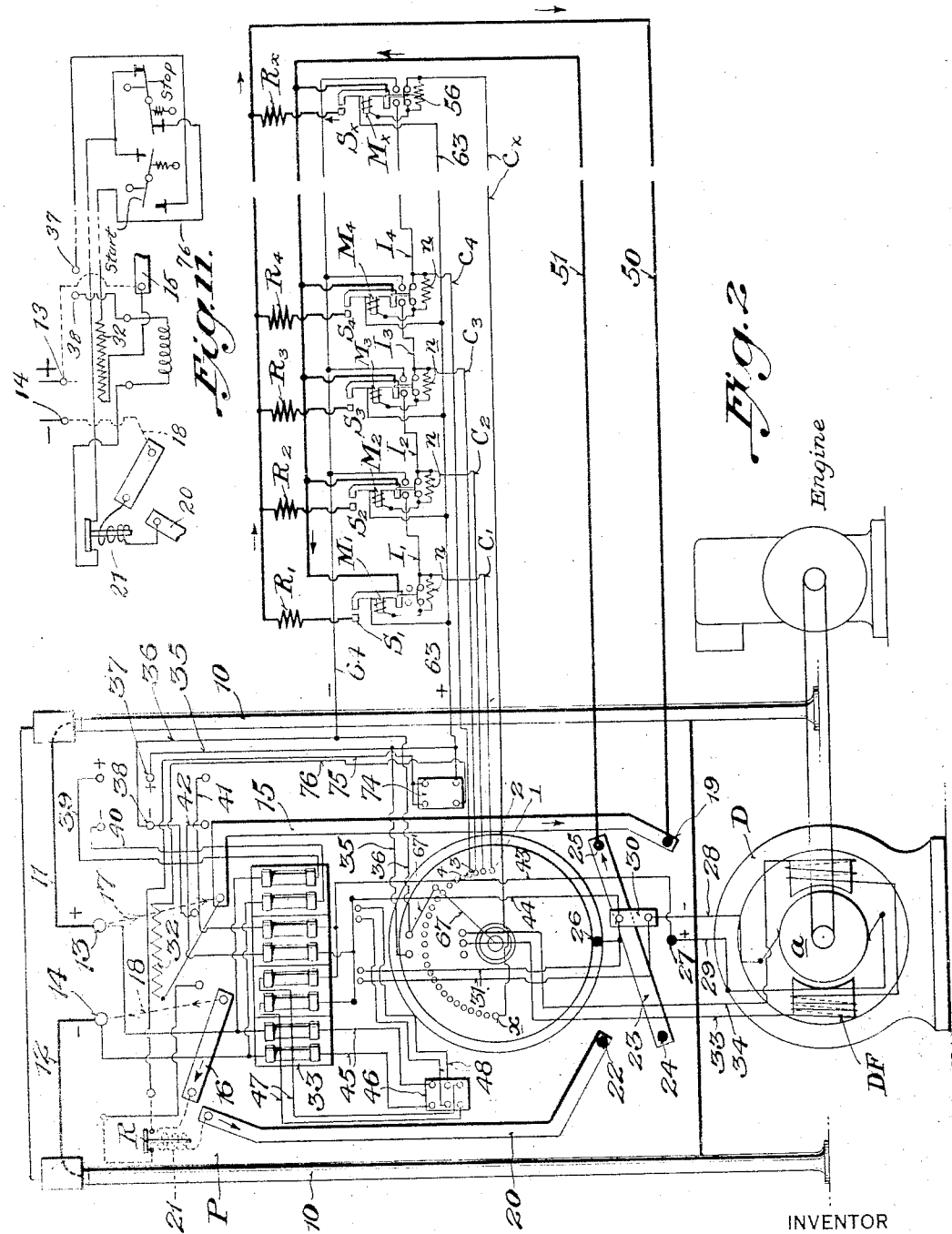
INVENTOR
Leonard R. Bogardus
By Foster, Freeman, Watson & Coit,
ATTORNEYS Dec. 11, 1923. 1,477,474
L. R. BOGARDUS
DYNAMOMETER CONTROL APPARATUS
Filed Jan. 16, 1919    3 Sheets-Sheet 3
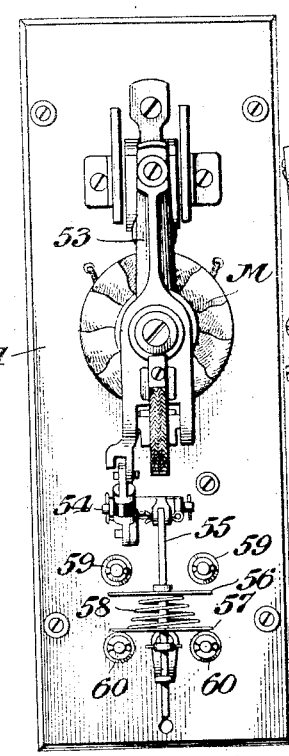
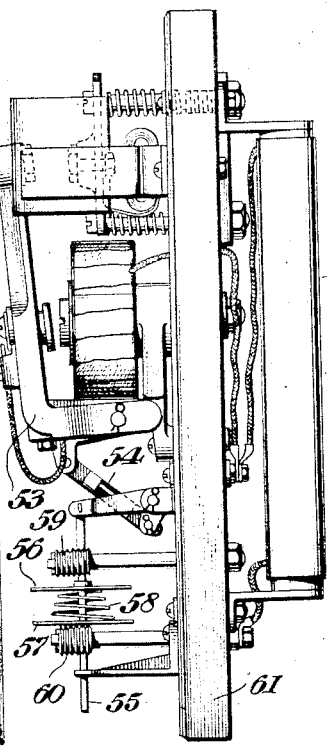
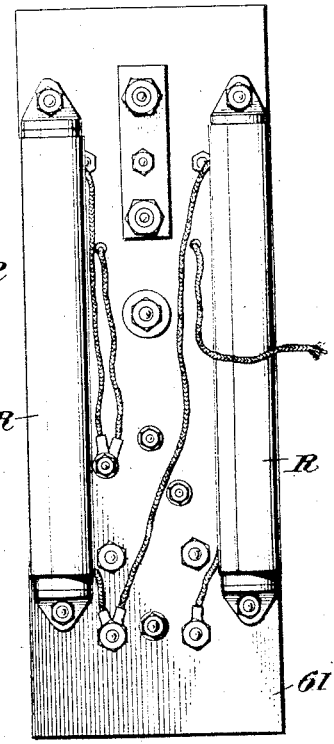
Fig. 8.    Fig. 9.    Fig. 10.
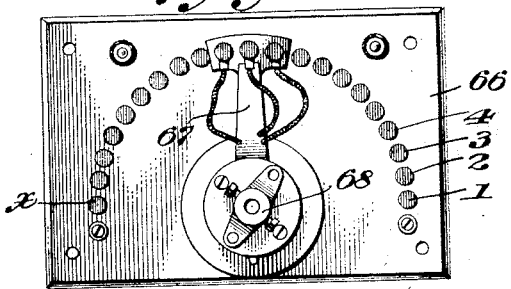
Fig. 6.
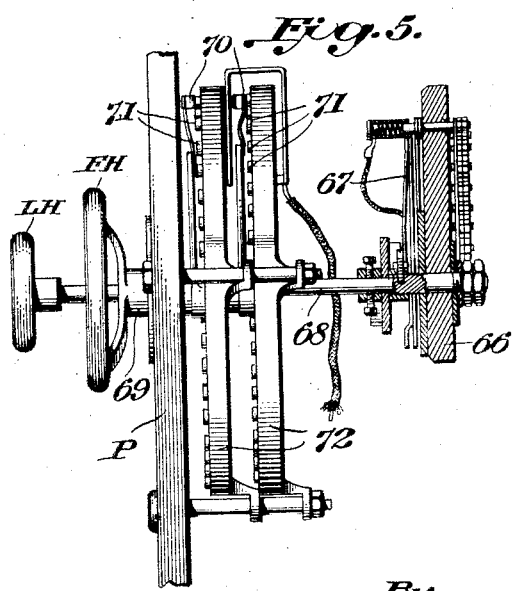
Fig. 5.
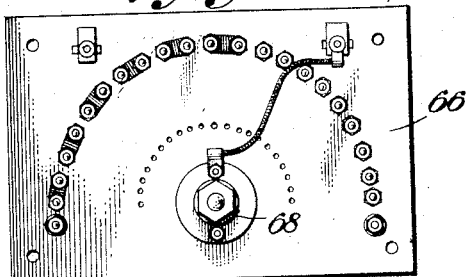
Fig. 7.
Inventor,
Leonard R. Bogardus,
By Foster, Freeman, Watson & Coit
Attys.

Patented Dec. 11, 1923.

1,477,474

UNITED STATES PATENT OFFICE.

LEONARD R. BOGARDUS, OF DETROIT, MICHIGAN, ASSIGNOR TO PACKARD MOTOR CAR COMPANY, OF DETROIT, MICHIGAN, A CORPORATION OF MICHIGAN.

DYNAMOMETER-CONTROL APPARATUS.

Application filed January 16, 1919. Serial No. 271,449.

*To all whom it may concern:*

Be it known that I, LEONARD R. BOGARDUS, a citizen of the United States, and resident of Detroit, Wayne County, State of Michigan, have invented certain new and useful Improvements in Dynamometer-Control Apparatus, of which the following is a specification.

This invention relates to electric dynamometers for testing the performance and efficiency of hydrocarbon engines and has particular reference to a novel control for such dynamometers.

It is well known that the power mechanically developed by a hydrocarbon engine may be determined by driving a dynamo-electric machine from the engine, the dynamo being suitably loaded.

According to the present invention a control apparatus is provided by means of which the dynamo-electric machine may be supplied with current from an external source to operate it as a motor to start the engine and bring it up to speed, after which the dynamo-electric machine, being driven by the engine, may be adjusted to operate as a generator and generate current that may be supplied to the mains or to suitable current translating or consuming means to constitute load for the engine. The load is preferably provided by current consuming devices consisting of a plurality of resistances arranged to be first inserted in the circuit of the dynamo-electric machine armature and gradually cut out of such armature circuit to serve as starting resistance when the electric machine is operated as a motor, and after the engine has been started and the electric machine operates as a generator, to be again inserted in such armature circuit to serve as current absorption resistances in which the current is dissipated as heat.

The principal object of the invention is to provide a control apparatus in which the switches for adjusting the circuit connections, the instruments for determining the potential and amperage of the power output, and auxiliary devices shall be arranged within convenient access to the operator, as for example, on a switchboard, and in which the heat developing absorption resistances shall be mounted independently of the foregoing instruments and preferably at some point remote from the switchboard where they will be comparatively out of the operator's way and in a better position to be ventilated.

The above and other objects and the novel features of the invention will be apparent from the following description taken in connection with the accompanying drawings, in which—

Fig. 1 is a front view of a switchboard comprising a part of a control apparatus embodying this invention;

Fig. 2 is a rear view of the switchboard showing the wiring thereon for interconnecting the instruments on the front thereof, and also showing, diagrammatically, the dynamo-electric machine, and the current absorbing resistances with the electro-magnetically operated switches controlling the same;

Figs. 3 to 7 inclusive are detail views of the radial switches for controlling the absorption resistances and the field current of the electric machine; and Figs. 8, 9 and 10 are respectively, front, side, and rear views of one of the electro-magnetically operated switches and its associated absorption resistance unit.

Figure 11 is a diagrammatic detail of the wiring between the "Start" and "Stop" buttons and the main circuit breaker.

Referring to the drawings, P designates a switchboard panel of suitable insulating material for supporting the instruments and conductors associated with the control system. The front of the panel has mounted thereon a double-throw field circuit switch F, a double-pole magnetic circuit breaker C, an overload relay R, an ammeter A, a voltmeter V, plates P', P'' carrying "Start" and "Stop" buttons, and "Line voltage," and "Machine voltage" buttons, respectively, field adjusting and load adjusting handles FH and LH, respectively, and line switches $L_1$, $L_2$. The panel is supported upon tubular standards 10 through which the main line conductors 11 and 12 extend from beneath the floor to the circuit breaker terminals 13 and 14 respectively, on the rear of the panel. Some of the circuits through the instruments on the front of the panel are indicated in dotted lines in the diagram of Fig. 2.

Suitable busbars 15 and 16 are arranged to be connected to the terminals 13 and 14 respectively, by brushes 17 and 18 of the circuit breaker C. The busbar 15 is connected adjacent its lower end to the terminal of a knife switch clip 19 and another busbar 20, connected to the busbar 16 through the overload relay coil 21, is connected at its lower end to the terminal of a knife switch clip 22. Still another busbar 23 is connected to the terminals of knife switch clips 24 and 25. The knife switches $L_1$, $L_2$ are pivoted on terminals 26 and 27 connected respectively to the leads 28 and 29 of the armature of the dynamo-electric machine D. A suitable ammeter shunt 30 in series with the lead 28 has conductors 31 connected to it and to the ammeter A whereby the armature current of the electric machine D may be determined.

The overload relay R controls the circuit of the trip coil of the circuit breaker C, an abnormal current in the coil 21 opening the circuit of the coil 32 and tripping the circuit breaker to open the main line circuit. A fuse block 33 carries suitable fuses for protecting the various auxiliary circuits. The field windings DF of the dynamo-electric machine may be either independently excited or self-excited by current supplied either from the mains 11, 12 or from the electric machine armature, through the conductors 33, 34 and 35, 36 the latter being connected to the center pair of terminals 37, 38 of the field switch F. When the switch F is thrown up the conductors 35, 36 will be connected to the conductors 39 and 40, respectively, which are respectively connected to the mains 11 and 12. When the field switch F is in its lower position the conductors 35, 36 are respectively connected by the conductors 41 and 42 to the conductors 43 and 44 which are connected across the armature leads 28 and 29, respectively. From the foregoing it will be apparent that the switch F in its upper position will connect the field winding of the electric machine to the supply mains so that the machine will be independently excited, and in its lower position will connect the field winding of the electric machine across the armature so that the electric machine will be self-exciting.

Conductors 45 are connected directly to the supply mains 11 and 12 and to the upper pair of terminals on the block 46 behind the voltage plate P″ and the lower pair of terminals on the same block is connected by the wires 47 to the wires 43, 44. The center pair of terminals on the block 46 is connected by the pair of conductors 48 to the terminals of the voltmeter V and, accordingly, by pressing the "Line voltage" button on the plate p″ the conductors 45 and 48 are electrically connected and the voltmeter will indicate the voltage of the line, and by pressing the "Machine voltage" button the conductors 47 and 48 will be electrically connected and the voltmeter will indicate the voltage of the current being generated by the dynamo-electric machine D.

A plurality of resistances $R_1, R_2, R_3, R_4,$—$R_x$ are connected to the conductor 50 and are adapted to be connected in parallel across the conductors 50, 51. These resistances are adapted to serve both as starting resistances in circuit with the armature $a$ of the electric machine D when the latter is started as a motor and also serve as current consuming resistances constituting load for the electric machine D when the latter is being driven by the engine and operating as a generator. The conductors 50, 51 are connected to the terminals 19, 25 respectively, and the connection of the resistances $R_1$—$R_x$ across the conductors 50, 51 is controlled by a corresponding number of electro-magnetically operable switches $S_1$—$S_x$, of any well known or preferred construction. The switches S shown in Figures 2 and 3 to 10 are of the electro-magnetically operable contactor type in which a pivoted contactor 53 is adapted to be operated by a magnet M to close the circuit including the resistance R. The contactor 52, by suitable links 54, is connected to a rod 55 carrying plates 56 and 57, and an interposed spring 58, such plates being arranged to close circuits including the terminals 59, 60, respectively. For the sake of clearness, only a single plate is shown in the diagram, Figure 2. Each contactor has associated with it a resistance R, and as indicated in Figures 3 to 10, each contactor and its associated resistance are mounted on a single panel 61 of suitable insulating material.

One of the most important features of the present invention consists in mounting the resistances independently of the switchboard, thereby saving wiring on the switchboard panel P, providing better ventilation for the resistances and also relieving the switchboard. Accordingly the resistances $R_1$—$R_x$ and their associated switches $S_1$—$S_x$ are mounted independently of the switchboard panel and upon suitable supports such as racks at a distance from the switchboard. However, the switches $S_1$—$S_x$ and their associated resistances $R_1$—$R_x$ are controlled from the switchboard by suitable devices and circuits now to be described.

The electro-magnets M of switches S are connected to a common circuit wire 63 which is in turn connected to the auxiliary current supply wire 35 which takes current either from the supply mains or from the dynamo electric machine D. The magnets M are also adapted to be connected to a return wire 64 electrically connected to the negative or return conductor 36 associated with the conductor 35.

The several magnets M are also electrically connected by control wires $C_1$—$C_x$ to a series of terminals 1, 2, 3, 4—$x$ disposed on a panel 66 on the rear of the switchboard panel P. The control wires $C_1$—$C_x$ are connected by a controller arm 67 to the conductor 67' which is electrically connected to the conductor 36. Accordingly the circuits of the electro-magnets M are successively closed by the radial switch arm 67 as it engages the successive contacts 1, 2—$x$ on the panel 66, such circuits being closed by way of the conductor 63, switch magnet M, control wire $c'$, contact engaged by the arm 67, the arm 67 and conductors 67' and 36, the conductors 35 and 36 being respectively connected to a source of current by the field switch F.

The arm 67 is carried by the post 68 which extends through the panel P and carries the adjusting handle LH at its outer end in front of the panel, said arm having suitable indicating means associated therewith to enable the operator to tell at a glance what resistances are connected in circuit.

The post 68 passes through a sleeve 69 secured to the field adjusting handle FH, the said sleeve 69 carrying contact shoes 70 which are movable over contacts 71 connected to resistances 72 inserted in circuit with the wires 33, 34, and 35, 36 connected to the field winding DF of the dynamo-electric machine D. The arms 70 and 67 are independently adjustable, and the amount of resistance in the armature circuit of the electric machine may thus be varied independently of the amount of resistance in circuit with the field winding.

The block 74 mounted behind the plate P' carries upper terminals that are connected to the wire 75 in circuit with the contacts of overload relay R and the coil of the circuit breaker C, and other terminals, one of which is connected by wire 76 to the bus bar 15 through resistance 32, and the other of which is connected to the conductor 35. These connections are clearly shown in Figure 11.

Assuming that the engine and the dynamo-electric machine are idle and that it is desired to test the engine, the line switches $L_1$ $L_2$ are moved into engagement with the terminal clips 22, 24; the field switch is closed upwardly, connecting terminals 37, 38 with conductors 39, 40, and the start button on pannel 74 is pressed. Pressing the start button closes a circuit through the coil of circuit breaker C as follows; from main 11, through the fuse to conductor 39, field switch, conductor 35, through the start button, conductor 75, contacts of overload relay R, through the coil of circuit breaker C, through the field switch to conductor 40, through the fuse to terminal 14 and main 12. The consequent energization of the coil of circuit breaker C operates the brushes 17, 18 to connect the mains 11, 12 with bus bars 15, 16. After the coil of the circuit breaker has attracted its armature, it retains said armature, upon opening of the start button, by the following circuit; main 11, brush 17, bus bar 15, resistance 32, conductor 76, stop button (which is normally closed by its spring) conductor 75, contacts of overload relay R, coil of circuit breaker C, field switch, conductor 40, fuse, terminal 14 and main 12.

The rotary switch arm 67 is then placed on contact 1, closing a circuit through magnet $M_1$, said circuit including positive wire 35, conductor 63, coil $M_1$, lower contacts of the switch, conductor $c_1$, contact 1, switch arm 67, conductor 67' to negative wire 36. Magnet $M_1$ attracts its armature, thereby connecting conductors 51, 50 through resistance $R_1$. This action also causes opening of the lower contacts of switch $S_1$, but the said switch is maintained closed by the limited current which the resistance $n$, bridging said contacts, permits to flow.

The dynamo-electric machine is now operated as a motor, current flowing through its armature from the main 11 by way of bus bar 15, conductor 50, resistance $R_1$, conductor 51, bus bar 23, switch arm $L_2$, conductor 29, the armature, conductor 28, shunt block 30, switch arm $L_1$, bus bar 20, coil 21 of the overload relay, bus bar 16 to main 12. Current is supplied to the field of the dynamo-electric machine through conductors 35, 36 and 33, 34 by way of the field rheostat controlled by handle FH.

As the motor gathers speed, the switch arm 67 is moved in a counter-clockwise direction over the contacts 2, 3, etc., at each contact causing energization of its corresponding switch magnet and inserting the resistance controlled thereby across the conductors 50, 51, in parallel with the preceding resistance or resistances, thus lowering the resistance of the armature circuit by successive steps. The preceding switches are retained in closed position upon closure of succeeding switches by the retaining circuits, which include positive wire 63, the coil of a preceding switch, the resistance $n$, the upper contacts of the succeeding switch to the negative wire 64.

After the engine has been started and is operating on its own power, the line switches $L_1$ $L_2$ are moved to connect the terminals 19, 25 with the terminals 27, 26, respectively. The armature of the dynamo-electric machine is thereby disconnected from the mains 11, 12 and connected with the conductors 50, 51. The field excitation may still be furnished by the line voltage, in which case the field switch is left in its upper position; but if it is desired to make the machine self exciting, this switch is moved to its lower position, where it connects the field across the armature by way of conductors 33, 34; 35, 36; 41, 42; and 43, 44. The dynamo-electric machine being now driven by the engine, the load on said engine may be varied by manipulating the rotary switch arm 67, thereby cutting in or out any desired number of resistance elements in the armature circuit; and the power output of the engine may be obtained by computing the product of the readings of the volt meter and ammeter plus the internal losses of the dynamo.

Instead of transforming the power of the dynamo into heat through the resistances, it may be desired at times to put this power into the line so that it may be converted into useful work. For this purpose, the switch $L_1$ is moved to connect terminals 22 and 26, the switch $L_2$ remaining on terminals 19 and 27. The armature leads are thus connected with bus bars 15 and 20, which are respectively connected with the mains 11 and 12. Before this is done, however, the field rheostat handle FH should be adjusted until the voltage delivered by the dynamo is equal to the voltage across the mains.

When it is desired to discontinue the operation of the apparatus for any reason, as to permit connecting up another engine for test, the stop button is pressed to open the circuit of the electro-magnetic circuit breaker C, thus disconnecting the mains from the switch board.

While I have shown and described in detail a preferred form of dynamometer control apparatus, it is to be understood that various changes may be made in the details thereof without departing from the spirit of the invention.

What is claimed is:

1. In a dynamometer, a switch board, a dynamo electric machine connected therewith and adapted to drive and be driven by an engine under test, a plurality of resistance elements mounted at a distance from said switch board, switch mechanism adapted to connect the armature of said dynamo-electric machine with said power mains through said resistance elements and to disconnect the power mains and connect the armature with said resistance elements, electro-magnetic switches connecting and disconnecting said resistance elements, and switch mechanism mounted on said switch board controlling said electro-magnetic switches.

2. In a dynamometer, a dynamo-electric machine adapted to be connected with an engine under test, a switch board, a source of electric power connected with said switch board, a plurality of resistance elements mounted separately from said switch board, switches mounted on said switch board and electrical connections controlled thereby for connecting the source of power to the dynamo-electric machine through any desired number of said resistance elements and for disconnecting the source of power from said dynamo-electric machine and connecting the latter in circuit with any number of said resistance elements.

3. In a dynamometer, a switch board, a dynamo-electric machine connected therewith and adapted to be connected with the engine under test, a plurality of separate resistance elements mounted at a distance from said switch board and electrically connected therewith, electro-magnetic switches controlling the connections of said resistance elements with said switch board, electrical connections between said electro-magnetic switches and said switch board, switches mounted on said switch board for controlling said electro-magnetic switches and for connecting said resistance elements in circuit with said dynamo-electric machine.

4. In a dynamometer for testing internal combustion engines, a switch board, a dynamo-electric machine, connected therewith and adapted to be connected with an engine under test, a plurality of resistance elements connected with said switch board but mounted independently thereof, power mains connected with said switch board, a controller mounted on said switch board and operable to connect said resistance elements successively in the connection between the power mains and the dynamo-electric machine when the latter is being operated as a motor to start the engine, and a switch on said switch board for disconnecting the power mains from said dynamo-electric machine and for connecting the latter with said resistance elements.

5. The combination with a dynamo-electric machine, of a power absorption resistance connected thereto, and means for varying the amount of resistance in circuit with said machine comprising a plurality of electro-magnetically operable switches operated from a dial switch, each of which controls a portion of the total resistance, means for controlling said switches one at a time in a predetermined order, from said dial switch and interlocks on said electromagnetic switches operable for closing the circuit of the electromagnetic switch next preceding it, thereby increasing the portions of resistance in the circuit as the arm of the dial switch moves across the dial.

6. The combination with a dynamo-electric machine, of a power absorption resistance connected thereto and comprising a plurality of resistance units arranged in parallel, means for varying the amount of resistance in circuit with said machine comprising electrically operable switches severally controlling the circuits of said resistance units, a switch comprising a plurality of terminals severally connected to said switches, an arm movable over said terminals, interlocks on each of said electrically operable switches for maintaining the switches closed after said arm has made contact with the terminals in passing over them in one direction, means for adjusting the field current of said electric machine, and means for indicating the power delivered by said machine.

7. In a dynamometer for testing internal combustion engines, a switch board, a dynamo-electric machine electrically connected therewith and adapted to be mechanically connected with an engine under test, a plurality of resistance elements connected with said switch board, power mains also connected with said switch board, and switch mechanism mounted on said board and operable to connect the power mains with said dynamo-electric machine through any desired number of said resistance elements, to disconnect the power mains from said dynamo-electric machine and connect the latter with any number of said resistance elements, and to disconnect said resistance and connect said dynamo-electric machine with the power mains.

8. In a dynamometer, a switch board, a dynamo-electric machine connected therewith and adapted to drive and be driven by an engine under test, power mains connected to said switch board, a plurality of resistance elements mounted at a distance from said switch board adapted to be connected in circuit with said dynamo-electric machine, a switch mounted on said switch board adapted to connect said dynamo-electric machine with the power mains through said resistance elements and to disconnect the power mains and connect the armature of said dynamo-electric machine to said resistance elements, electromagnetic switches connected to said switch board for connecting and disconnecting the resistance elements, and switch mechanism mounted on said switch board comprising a plurality of contacts connected respectively to said electromagnetic switches and a manually operable arm adapted to sweep over said contacts and connect them successively with the source of power.

9. In a dynamometer, a switch board, a dynamo-electric machine connected therewith and adapted to drive and be driven by an engine under test, power mains connected to said switch board, a plurality of resistance elements mounted separately from said switch board, a switch mounted on said switch board adapted in one position to connect said power mains to said dynamo-electric machine through said resistance elements, in another position to connect the armature of said dynamo-electric machine to said resistance elements, and in a third position to connect the armature of said dynamo-electric machine directly to said power mains, and switch mechanism mounted on said switch board controlling the connections of said resistance elements.

10. In a dynamometer, a switch board, a dynamo-electric machine connected therewith and adapted to drive and be driven by an engine under test, power mains connected to said switch board, a switch mounted on said switch board adapted in one position to connect the field of the dynamo electric machine with said power mains and in another position to connect said field with the armature of said dynamo-electric machine, a manually controlled rheostat inserted in the connections between said switch and said field, a plurality of resistance elements mounted separately from said switch board and adapted to be successively connected in circuit with said dynamo-electric machine, a second switch mounted on said switch board adapted to connect the armature of said dynamo-electric machine with the power mains through said resistance elements and to disconnect the armature from said power mains and connect it said resistance elements, and switch mechanism mounted on said switch board controlling the connections of said resistance elements.

11. In a dynamometer, a switch board, a dynamo electric machine connected therewith and adapted to be driven by an engine under test, power mains connected to said switch board, a switch mounted on said switch board adapted in one position to connect the field of said dynamo electric machine with said power mains and in another position to connect said field with the armature of said dynamo electric machine, a manually controlled rheostat inserted in the connections between said switch and said field, a plurality of resistance elements mounted separately from said switch board and electrically connected thereto, a second switch mounted on said switch board adapted to connect the armature of said dynamo electric machine with the power mains through said resistance elements and to disconnect the armature from said power mains and connect it to said resistance elements, electromagnetic switches for connecting and disconnecting the resistance elements, and switch mechanism controlling the connections of said resistance elements comprising a circular series of contacts mounted on said switch board and connected to said electromagnetic switches and a manually operable contact arm adapted to sweep over said contacts and successively energize them.

12. In a dynamometer, a switch board, a dynamo electric machine connected therewith and adapted to be driven by an engine under test, power mains connected to said switch board, a switch mounted on said switch board adapted in one position to connect the field of said dynamo electric machine with said power mains and in another position to connect said field with the armature of said dynamo electric machine, a rheostat inserted in the connections between said switch and said field comprising a sleeve rotatably mounted in said switch board having a hand wheel fixed to the front end thereof and contact arms fixed thereto in rear of the switch board contacting a circular series of contacts to which the resistance elements of the rheostat are connected, a plurality of resistance elements mounted at a distance from said switch board adapted to be connected to said dynamo electric machine, a second switch mounted on said switch board adapted to connect the armature of said dynamo electric machine with the power mains through said resistance elements and to disconnect the armature from said power mains and connect it to said resistance elements, electromagnetic switches connecting and disconnecting the resistance elements, and switch mechanism controlling said electromagnetic switches comprising a circular series of contacts connected respectively to said electromagnetic switches and a post mounted in said sleeve having a knob on its front end and a contact arm on its rear end adapted to contact said contacts.

13. In a dynamometer, a switch board, a dynamo electric machine connected therewith and adapted to be driven by an engine under test, power mains connected to said switch board, a switch mounted on said switch board, adapted in one position to connect the field of said dynamo electric machine with said power mains and in another position to connect said field with the armature of said dynamo electric machine, a manually operable rheostat mounted on said switch board inserted in the connections between said switch and said field, a plurality of resistance elements mounted at a distance from said switch board adapted to be connected to said dynamo electric machine, a second switch mounted on said switch board adapted to connect the armature of said dynamo electric machine with the power mains through said resistance elements and disconnect the armature from said power mains and connect it to said resistance elements, electromagnetic switches connecting and disconnecting the resistance elements, switch mechanism mounted on said switch board controlling said electromagnetic switches, an energy meter mounted on said switch board, and a switch for connecting said meter across the power mains or across the armature of said dynamo electric machine.

In testimony whereof I affix my signature.

LEONARD R. BOGARDUS.